United States Patent
Li et al.

(10) Patent No.: US 9,621,312 B2
(45) Date of Patent: Apr. 11, 2017

(54) RF TRANSCEIVER ARCHITECTURE FOR FLEXIBLE CONFIGURATION OF RF RESOURCES

(71) Applicant: Aviacomm Inc., Sunnyvale, CA (US)

(72) Inventors: Tao Li, Campbell, CA (US); Hans Wang, Mountain View, CA (US); Binglei Zhang, San Jose, CA (US); Shih Hsiung Mo, San Jose, CA (US)

(73) Assignee: AVIACOMM INC., Sunnyvale, CA (US)

( * ) Notice: Subject to any disclaimer, the term of this patent is extended or adjusted under 35 U.S.C. 154(b) by 289 days.

(21) Appl. No.: 14/085,561

(22) Filed: Nov. 20, 2013

(65) Prior Publication Data

US 2014/0146761 A1    May 29, 2014

Related U.S. Application Data

(60) Provisional application No. 61/730,015, filed on Nov. 26, 2012.

(51) Int. Cl.
*H04L 5/00* (2006.01)
*H04L 5/14* (2006.01)

(52) U.S. Cl.
CPC ............ *H04L 5/001* (2013.01); *H04L 5/0023* (2013.01); *H04L 5/0028* (2013.01); *H04L 5/0042* (2013.01); *H04L 5/0092* (2013.01); *H04L 5/14* (2013.01)

(58) Field of Classification Search
CPC ..... H04L 5/001; H04L 5/0023; H04L 5/0028; H04L 5/0042; H04L 5/0092; H04L 5/0037; H04L 5/1453; H04L 5/0041; H04L 5/14

USPC .................... 370/328, 329; 455/73
See application file for complete search history.

(56) References Cited

U.S. PATENT DOCUMENTS

| | | | | |
|---|---|---|---|---|
| 8,200,181 | B1 * | 6/2012 | Khlat | H04B 1/0057 455/311 |
| 9,325,553 | B2 * | 4/2016 | Kaukovuori | H04B 1/0057 |
| 2007/0155350 | A1 * | 7/2007 | Razavi | H03J 1/0008 455/147 |
| 2007/0275675 | A1 * | 11/2007 | Darabi | H04B 1/406 455/118 |
| 2008/0181336 | A1 * | 7/2008 | Maxim | H03D 7/14 375/340 |
| 2009/0227214 | A1 * | 9/2009 | Georgantas | H04B 1/30 455/86 |
| 2011/0019723 | A1 * | 1/2011 | Lerner | H04B 7/0871 375/219 |
| 2011/0195675 | A1 * | 8/2011 | Nitsche | H04B 1/40 455/90.2 |

* cited by examiner

*Primary Examiner* — Habte Mered
*Assistant Examiner* — Rownak Islam
(74) *Attorney, Agent, or Firm* — Shun Yao; Park, Vaughan, Fleming & Dowler LLP

(57) ABSTRACT

One embodiment of the present invention provides a wireless transceiver. The transceiver includes a plurality of receiving paths, a plurality of transmitting paths, a number of RF components, and a configurable multiplexer for coupling one or more RF components to the transmitting paths and the receiving paths. The multiplexer is configured in such a way as to allow a particular RF component to couple to a subset of the receiving paths and/or a subset of the transmitting paths, thereby enabling flexible provisioning of the RF components.

18 Claims, 6 Drawing Sheets

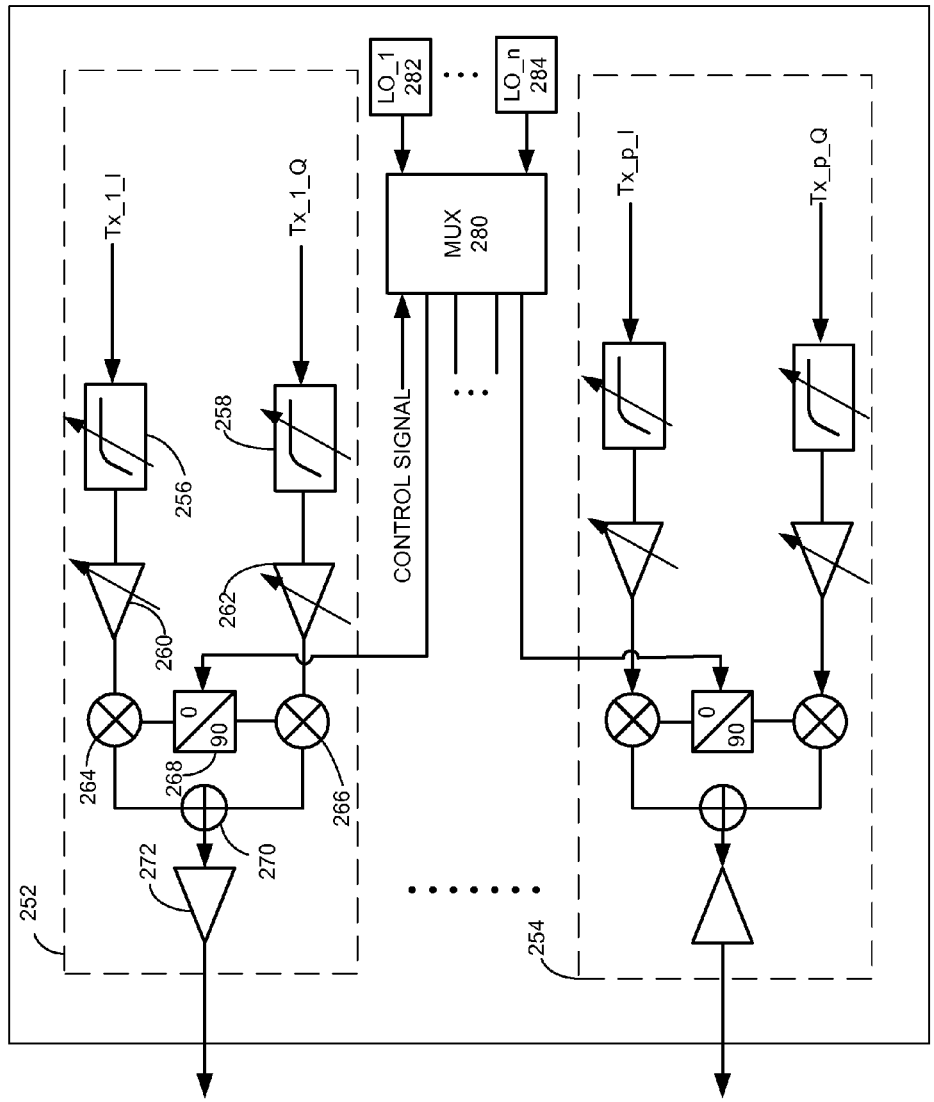

RF TRANSCEIVER ARCHITECTURE FOR FLEXIBLE CONFIGURATION OF RF RESOURCES

RELATED APPLICATION

This application claims the benefit of U.S. Provisional Application No. 61/730,015, entitled "RF Transceiver Architecture for Flexible Configuration of RF Resources," by inventors Tao Li, Hans Wang, Binglei Zhang, and Shih Hsiung Mo, filed 26 Nov. 2012.

BACKGROUND

Field

The present disclosure relates generally to an RF transceiver. More specifically, the present disclosure relates to an RF transceiver with an increased flexibility that can meet the needs of modern wireless communication.

Related Art

In order to improve data throughput and link range, modern day wireless communication standards, such as 3GPP LTE (Long Term Evolution) and 4G, often adopt multiple-input and multiple-output (MIMO) technology as well as channel (or carrier) aggregation. Moreover, these standards support both frequency-division duplexing (FDD) and time-division duplexing (TDD) systems. To support MIMO, wireless transceiver needs to include multiple transmitting and receiving paths. To support channel aggregation and FDD, the different transmitting/receiving paths may need to operate at different frequencies. As the number of transmitting or receiving paths increases, the number of hardware components increases as well.

SUMMARY

One embodiment of the present invention provides a wireless transceiver. The transceiver includes a plurality of receiving paths, a plurality of transmitting paths, a number of RF components, and a configurable multiplexer for coupling one or more RF components to the transmitting paths and the receiving paths. The multiplexer is configured in such a way as to allow a particular RF component to couple to a subset of the receiving paths and/or a subset of the transmitting paths, thereby enabling flexible provisioning of the RF components.

In a variation on this embodiment, the transceiver further includes a baseband controller configured to: determine operating frequencies of the plurality of receiving paths and the plurality of transmitting paths, generate a control signal based on the operating frequencies of the plurality of receiving paths and the plurality of transmitting paths, and send the control signal to the multiplexer in order to configure the multiplexer.

In a variation on this embodiment, the RF components include local oscillators (LOs).

In a further variation, a particular local oscillator is configured to couple to a subset of the plurality of receiving paths and/or a subset of the transmitting paths that are operating at a same frequency.

In a further variation, each receiving path includes a demodulator which receives sinusoidal waves from a coupled local oscillator, and each transmitting path includes a modulator which receives sinusoidal waves from a coupled local oscillator.

In a variation on this embodiment, the plurality of receiving paths and/or the plurality of transmitting paths includes one or more of: multiple-input and multiple-output (MIMO) paths, and channel aggregation paths.

In a variation on this embodiment, the one or more RF components coupled to the receiving paths and/or transmitting paths are activated, and remaining RF components that are not coupled to any one of the plurality of receiving paths and the plurality of transmitting paths remain inactive.

BRIEF DESCRIPTION OF THE FIGURES

FIG. 2B presents a diagram illustrating an exemplary architecture of a multi-path transmitter circuit, in accordance with an embodiment of the present invention.

DETAILED DESCRIPTION

Figure 1A:
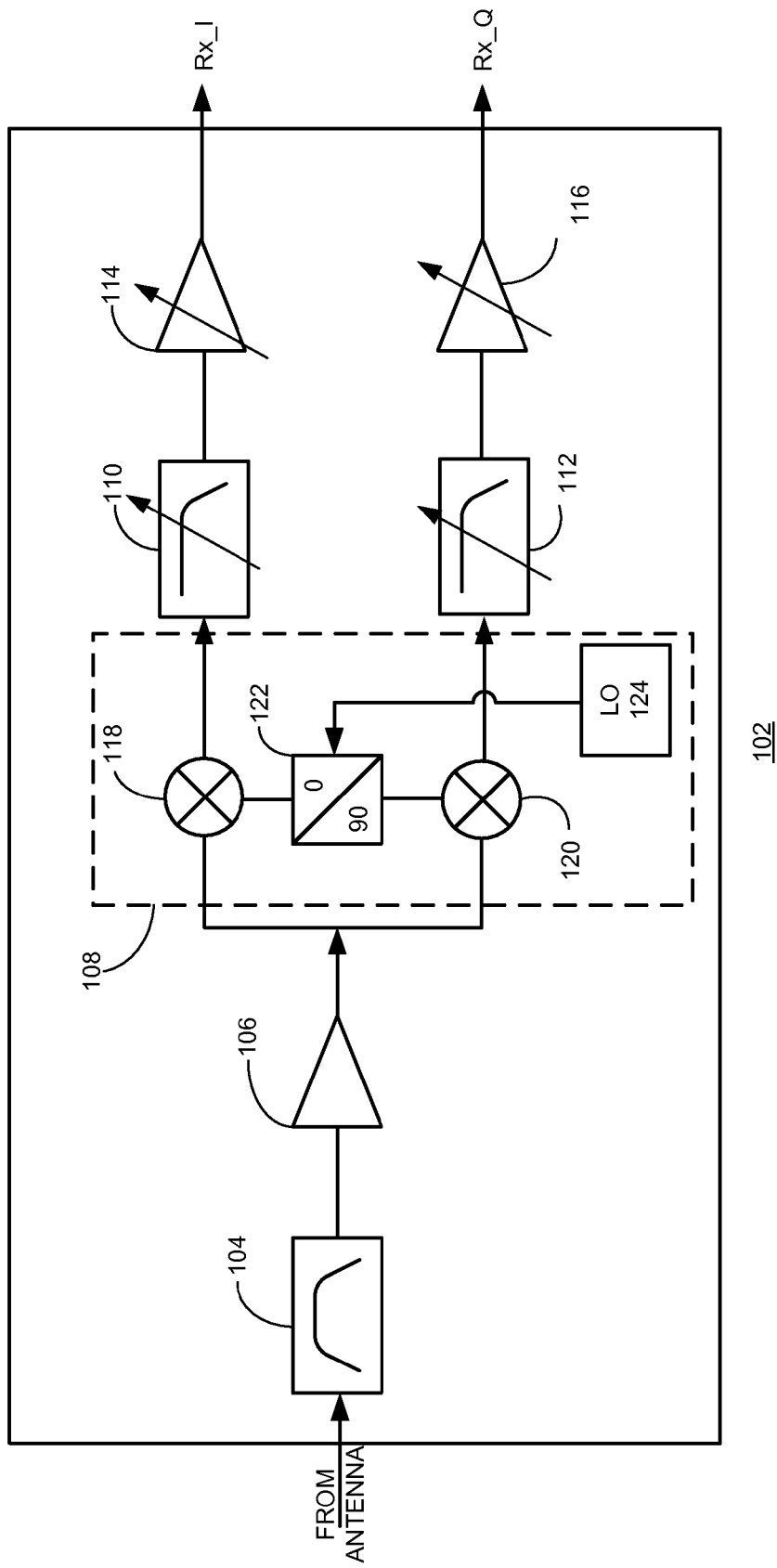
FIG. 1A presents a diagram illustrating a conventional single-path RF receiver circuit (prior art).

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide an RF transceiver that includes multiple transmitting and receiving paths. Each transmitting or receiving path can be configured to work at a frequency that is the same as or different from the RF frequency used by a different path. Moreover, all transmitting and receiving paths share a bank of local oscillators (LOs). Depending on the configuration of the RF resources (such as the operating frequencies of each transmitting or receiving path), a subset of the LOs can be activated.

The Multi-Path Transceiver

MIMO has been widely used in modern wireless communication because it offers significant increases in data throughput and link range without additional bandwidth or increase transmit power. More particularly, 3GPP LTE and 4G standards have adopted multi-user MIMO (MU-MIMO) for broadcast and multiple access. Usage of the MIMO technologies means that the wireless transceivers now need to support one or more MIMO channels, each MIMO channel having multiple data paths. For example, for a MIMO channel with two transmit antennas and two receive antennas, signals transmitted from both transmit antennas are separately received at each receive antenna, and two independent receiving paths are needed to demodulate the received RF signals.

In addition to MIMO, channel aggregation (also known as carrier aggregation) is also adopted by the LTE standards as a way to increase the data throughput. More specifically, channel aggregation (CA) allows multiple carrier frequencies to be used to increase the channel bandwidth. Note that based on the spectrum availability, the multiple carriers may belong to the same frequency band (intra-band CA) or different frequency bands (inter-band CA). To support channel aggregation in the downlink, the wireless receiver needs to be able to simultaneously receive multiple carrier frequencies, which may belong to different frequency bands (for inter-band CA). Hence, multiple receiving paths are needed to simultaneously demodulate signals at the different frequency bands. Similarly, if inter-band CA is used in the uplink, multiple transmitting paths will be needed.

The combination of MIMO and channel aggregation means that device vendors need to provide radios with multiple MIMO channels (each MIMO channel can be designated for a particular carrier frequency and may include multiple paths) with operational compatibility with multiple frequency bands and multiple communication standards. Moreover, in addition to normal receiving, the receiver may also need to monitor a different RF channel for handover, thus requiring an additional receiving path. Meeting these requirements can be challenging given the size and power constraints of handheld devices.

FIG. 1A presents a diagram illustrating a conventional single-path RF receiver circuit (prior art). In FIG. 1A, receiver 102 includes a band-pass filter (BPF) 104, a low-noise amplifier (LNA) 106, an IQ (in-phase quadrature) demodulator 108, tunable low-pass filters (LPFs) 110 and 112, and variable gain amplifiers (VGAs) 114 and 116. IQ demodulator 108 includes mixers 118 and 120, a 90°/0° phase shifter 122, and a local oscillator (LO) 124.

During normal operation, incoming RF signals received from the antenna (not shown in the figure) are filtered and amplified by BPF 104 and LNA 106, respectively. Subsequently, the RF signal is down-converted to in-phase (I) and quadrature (Q) baseband signals by IQ demodulator 108. Note that, in order to perform the down-conversion (or to generate the sum and difference frequencies at the baseband I/Q output ports), LO 124 needs to provide I and Q mixers 118 and 120 with a sinusoidal wave at a frequency that is the same as the carrier frequency of the desired signal. LPFs 110 and 112 can heavily reject the summation frequency and allow only signals at the difference frequency (the baseband signals) to pass. The demodulated I and Q signals (Rx_I and Rx_Q) are then amplified by VGAs 114 and 116, respectively, before being converted to the digital domain by analog-to-digital converters (ADCs) and sent to the baseband processor for further processing. For simplicity, FIG. 1A does not shown the ADCs and the baseband processor.

Figure 1B:
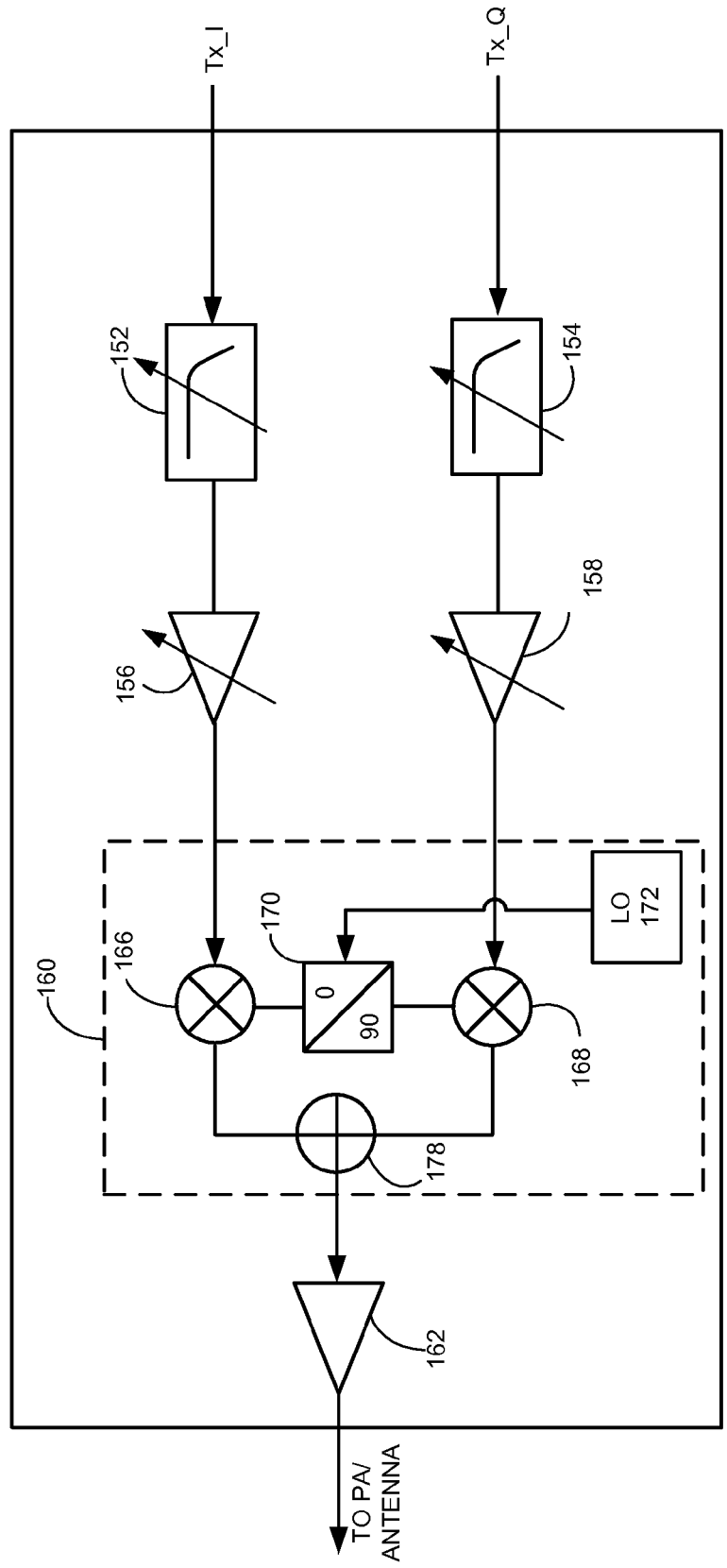
FIG. 1B presents a diagram illustrating a conventional single-path RF transmitter circuit (prior art).

FIG. 1B presents a diagram illustrating a conventional single-path RF transmitter circuit (prior art). In FIG. 1B, transmitter 150 includes LPFs 152 and 154, VGAs 156 and 158, an IQ modulator 160, and a power amplifier (PA) driver 162. IQ modulator 160 includes mixers 166 and 168, a 90°/0° phase shifter 170, a local oscillator (LO) 172, and an adder 178.

During normal operation, analog I and Q baseband signals (Tx_I and Tx_Q) are filtered and amplified by LPFs 152-154 and VGAs 156-158, respectively, before being sent to IQ modulator 160, which modulates the I and Q signals separately. The modulated I and Q signals are combined at adder 178, and the combined signal is then amplified by PA driver 162 before being sent to the PA and antenna for transmission.

As one can see from FIGS. 1A-1B, the single-path receiver and transmitter both include multiple RF components; some are passive (such as filters and adders) and some consume power (such as amplifiers and LOs). If a transceiver includes a plurality of transmitting and receiving paths, it may need to include multiple copies of all the components shown in FIGS. 1A and 1B. Such a transceiver circuit not only has a larger footprint but may also consume lots of power, especially when all power-consuming components are activated. However, some of those components may be redundant. For example, depending on the current standard and the duplexing scheme used, a number of different transmitting/receiving paths may operate at the same frequency. Hence, the multiple LOs that provide sinusoidal waves at the same frequency may be redundant. However, replacing the multiple LOs with a single LO can also be problematic, because in a different situation (such as when TDD is replaced with FDD), there may be a need for those multiple LOs again. To solve such a problem, embodiments of the present invention provide a solution that enhances the flexibility of the transmitter/receiver circuit. More specifically, instead of having a dedicated LO for each transmitting/receiving path, a bank of LOs can be shared by all transmitting/receiving paths. Depending on the frequency needs, the transmitting/receiving circuit can be configured to have a minimum number of LOs activated, thus preventing power wastage.

Figure 2A:
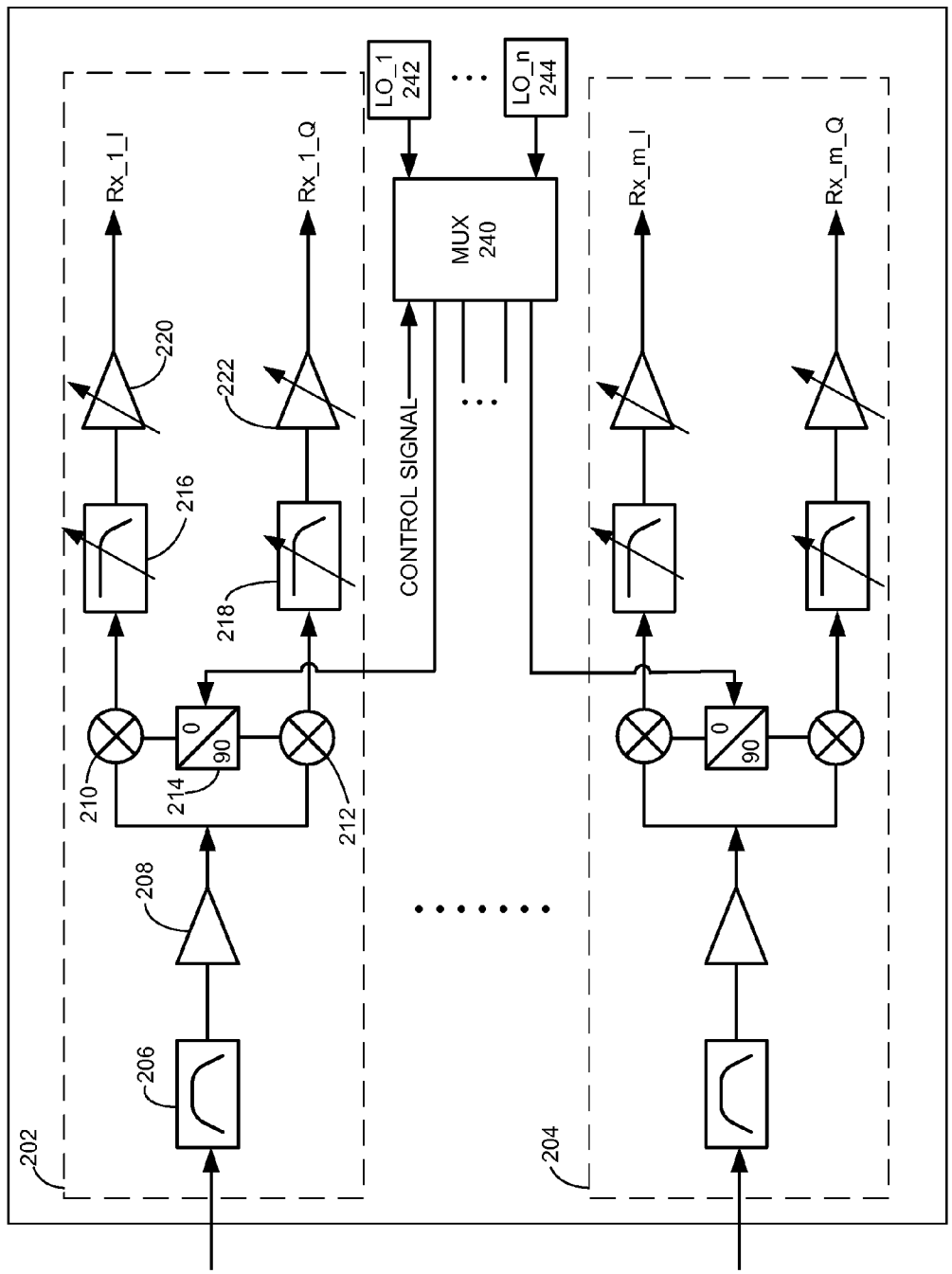
FIG. 2A presents a diagram illustrating an exemplary architecture of a multi-path receiver circuit, in accordance with an embodiment of the present invention.

FIG. 2A presents a diagram illustrating an exemplary architecture of a multi-path receiver circuit, in accordance with an embodiment of the present invention. In FIG. 2A, multi-path receiver circuit 200 includes multiple (up to m) receiving paths, such as a receiving path 202 and a receiving path 204; a multiplexer 240; and a number of LOs, such as LO_1 242 and LO_n 244.

Each receiving path includes a number of components that are dedicated to that path. For example, receiving path 202 includes a BPF 206, an LNA 208, mixers 210 and 212, a 90°/0° phase shifter 214, LPFs 216 and 218, and VGAs 220 and 222. In one embodiment, to ensure that each receiving path can be configured to operate under different wireless communication standards, these components, such as filters and amplifiers, can operate over a wide frequency range. For example, BPF 206 and LPFs 216 and 218 may have a tunable range covering the entire wireless communication spectrum (from 300 MHz all the way up to 3.6 GHz), and likewise LNA 208 and VGAs 220 and 222 may have an ultra-wide bandwidth ranging from 300 MHz all the way up to 3.6 GHz.

As shown in FIG. 2A, each receiving path in multi-path receiver circuit 200 includes components similar to those that were included in single-path receiver circuit 102, except that the receiving path does not include a dedicated LO. Instead, the mixers within each receiving path can be coupled to an LO via multiplexer 240. In one embodiment, multiplexer 240 is an m×n multiplexer, where m is the number of receiving paths and n the number of LOs. In one embodiment, n can be equal to or less than m. During operation, based on the frequency needs, multiplexer 240 can be configured to allow a single LO to be coupled to multiple receiving paths, thus providing simultaneous sinusoidal waves (which are needed for demodulating received signals) to those multiple paths. For example, if all receiving paths are MIMO paths operating at the same frequency, then only a single LO is needed. Consequently, all other LOs can be powered off, thus significantly reducing power usage. On the other hand, in the event of handover, one receiving path may be used to monitor another RF channel at a different frequency, and an additional LO will be activated and coupled to that receiving path via multiplexer 240. Similarly, if each receiving path is a CA channel and all receiving paths operate at different frequencies, then each receiving path will be provided with an individual LO via multiplexer 240.

The configuration shown in FIG. 2A provides LO usage flexibility. In other words, the LOs can be activated based on frequency demands. The number of LOs that are activated can be determined based on the total number of frequencies needed by all receiving paths. As a result, when the number of frequencies needed is less than the number of receiving paths, only a small number of LOs will be activated, with the multiple receiving paths that operate at the same frequency sharing a common LO. Consequently, the amount of power needed to operate the receiver can be reduced. As one can see in FIG. 2A, by configuring multiplexer 240, one can couple any LO to any one or more receiving paths.

Note that the baseband processor is responsible for maintaining information regarding the operating frequencies of all receiving paths. For example, the baseband processor determines which receiving paths are MIMO paths operating at one frequency and which receiving paths are CA channels with different frequencies. Based on the frequency information, the baseband processor/controller can send a control signal to configure multiplexer 240 in order to couple appropriate LOs to corresponding receiving paths.

FIG. 2B presents a diagram illustrating an exemplary architecture of a multi-path transmitter circuit, in accordance with an embodiment of the present invention. In FIG. 2B, multi-path transmitter circuit 250 includes multiple (up to p) transmitting paths, such as a transmitting path 252 and a transmitting path 254; a multiplexer 280; and a number of LOs, such as LO_1 282 and LO_n 284.

Each transmitting path includes a number of components that are dedicated to that path. For example, transmitting path 252 includes LPFs 256 and 258, VGAs 260 and 262, mixers 264 and 266, a 90°/0° phase shifter 268, an adder 270, and a power amplifier (PA) driver 272. In one embodiment, to ensure that each transmitting path can be configured to operate under different wireless communication standards, these components, such as filters and amplifiers, can operate over a wide frequency range. For example, LPFs 256 and 258 may have a tunable range covering the entire wireless communication spectrum (from 300 MHz all the way up to 3.6 GHz), and PA driver 272 and VGAs 260 and 262 may have an ultra-wide bandwidth ranging from 300 MHz all the way up to 3.6 GHz.

As shown in FIG. 2B, each transmitting path in multi-path transmitter circuit 250 includes components similar to those that were included in single-path transmitter circuit 150, except that the transmitting path does not include a dedicated LO. Instead, the mixers within each transmitting path can be coupled to an LO via multiplexer 280. In one embodiment, multiplexer 280 is a p×n multiplexer, where p is the number of transmitting paths and n the number of LOs. In one embodiment, n can be equal to or less than p. During operation, based on frequency needs, multiplexer 280 can be configured to allow a single LO to be coupled to multiple transmitting paths, thus providing simultaneous sinusoidal waves (which are needed for demodulating received signals) to those multiple paths. For example, if all transmitting paths are operating at the same frequency, then only a single LO is needed, and all other LOs can be powered off, thus significantly reducing power usage of transmitter circuit 250. On the other hand, if each transmitting path is a CA channel operating at a frequency that is different from other paths, then each transmitting path will be provided with an individual LO via multiplexer 280.

Similar to multiplexer 240 located on receiver circuit 200, multiplexer 280 receives a control signal from the baseband processor/controller. Such a control signal configures multiplexer 280 to provision the LOs to the transmitting paths based on their frequency needs.

Figure 3:
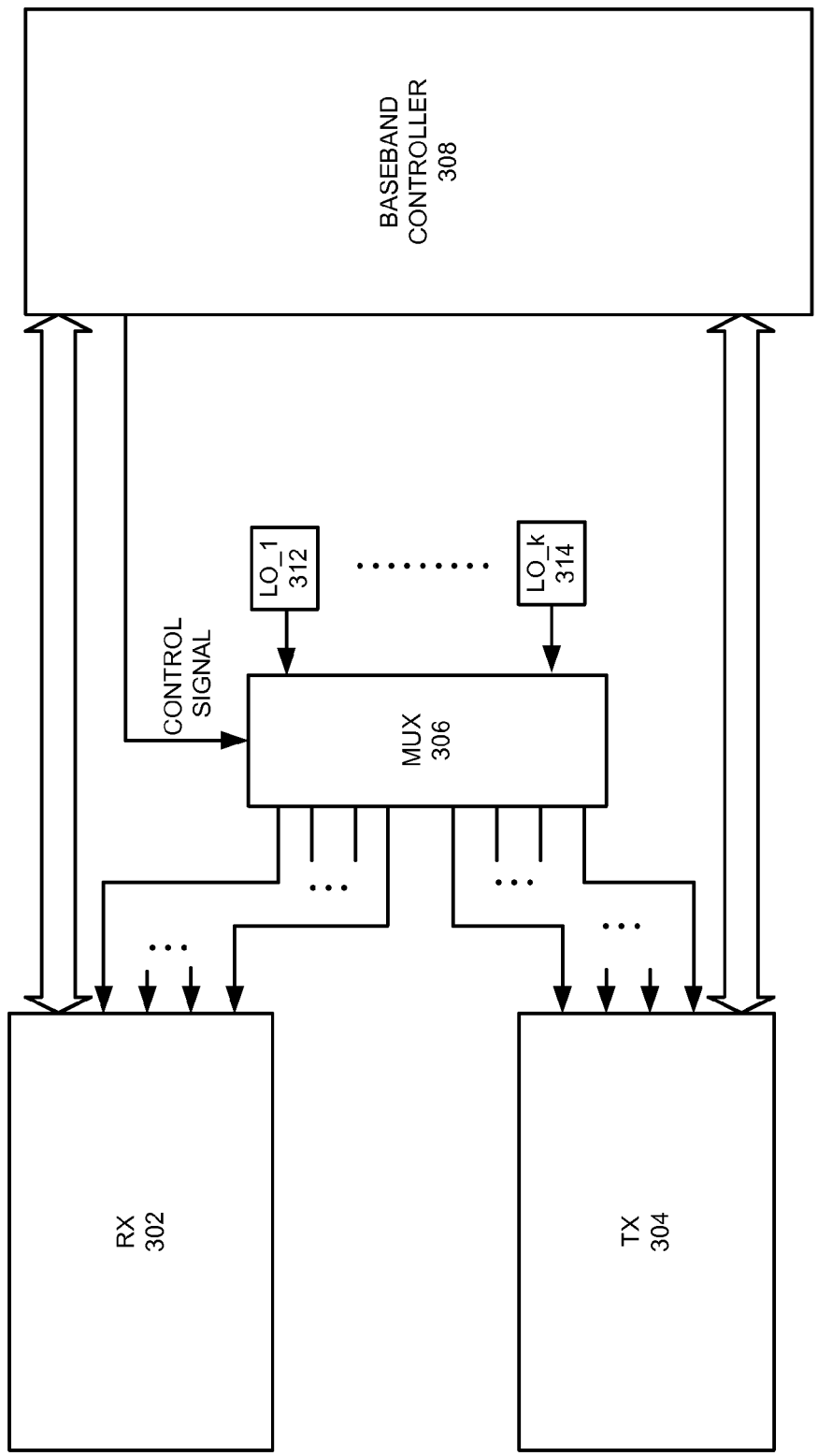
FIG. 3 presents a diagram illustrating an exemplary RF transceiver, in accordance with an embodiment of the present invention.

Note that, based on the different duplexing schemes (such as TDD and FDD), it is also possible for the transmitter and the receiver to share the LOs. For example, if the uplink and the downlink use TDD, then the transmitter and the receiver can both work at the same frequency and share LOs. FIG. 3 presents a diagram illustrating an exemplary RF transceiver, in accordance with an embodiment of the present invention.

In FIG. 3, RF transceiver 300 includes a multi-path receiving circuit 302, a multi-path transmitting circuit 304, a multiplexer 306, a number of LOs (such as LO_1 312 and LO_k 314) and a baseband controller 308. Multi-path receiving circuit 302 includes multiple receiving paths, with each receiving path being similar to receiving path 202 or 204 shown in FIG. 2A. Likewise, multi-path transmitting circuit 304 includes multiple transmitting paths, with each transmitting path being similar to transmitting path 252 or 254 shown in FIG. 2B. Multiplexer 306 couples LOs and the multiple receiving/transmitting paths. In one embodiment, multiplexer 306 is an (m+p)×k multiplexer, where m is the number of receiving paths, n the number of transmitting paths, and k the number of LOs. In a further embodiment, k≤m+p. Baseband controller 308 is responsible for generating and sending the control signal for configuring multiplexer 306. Note that, like the circuit shown in FIGS. 2A and 2B, the architecture shown in FIG. 3 allows one to couple any LO to any receiving or transmitting path by configuring multiplexer 306. This flexibility in provisioning the LOs makes it possible for transceiver 300 to support services of different standards or services provided by different service providers. For example, some standards may employ CA, thus having multiple transmitting and/or receiving paths operating at different frequencies. To support these standards, different LOs can be used to couple to the different transmitting/receiving paths. Moreover, depending on the duplexing scheme, the transmitting and receiving paths may operate at the same or different frequencies. For example, for TDD, the transmitting and receiving paths may operate at the same frequency, thus being capable of LO sharing. On the other hand, when FDD is used, different LOs need to be activated to provide frequency support to the transmitting and receiving paths.

In one embodiment, receiving circuit 302 includes two MIMO channels and two CA channels, with a total of four receiving paths operating at two separate frequencies. Moreover, transmitting circuit 304 includes two CA paths operating at two separate frequencies. If the duplexing scheme is TDD, then the transmitting paths and the receiving paths can operate at the same frequencies. Consequently, two LOs are sufficient to meet the frequency needs of the four receiving paths and the two transmitting paths together. The two selected LOs can couple to those transmitting paths and receiving paths via multiplexer 306. On the other hand, if the duplexing scheme is FDD, then the transmitting paths and the receiving paths need to operate at different frequencies. Consequently, four LOs (two for the receiving paths and two for the transmitting paths) would be needed to meet the frequency needs of the entire transceiver.

When transceiver 300 is used by a user moving from cell to cell, the network environment may change dynamically, meaning that the receiving or transmitting paths that are activated and their operating frequencies may also be updated dynamically. As a result, multiplexer 306 needs to be configured dynamically to allow dynamic frequency-need-based LO provisioning. In one embodiment, when transceiver 300 is powered on, baseband controller 308 determines the current active standard, the needs of the transmitting/receiving paths, and their operating frequencies. Based on the frequency needs of the transmitting/receiving paths, baseband controller 308 generates a control signal, which is sent to multiplexer 306. Such a control signal can be used to configure multiplexer 306 in order to couple appropriate LOs to the corresponding transmitting/receiving paths. In one embodiment, only a minimum number of LOs are activated in order to conserve power.

Figure 4:
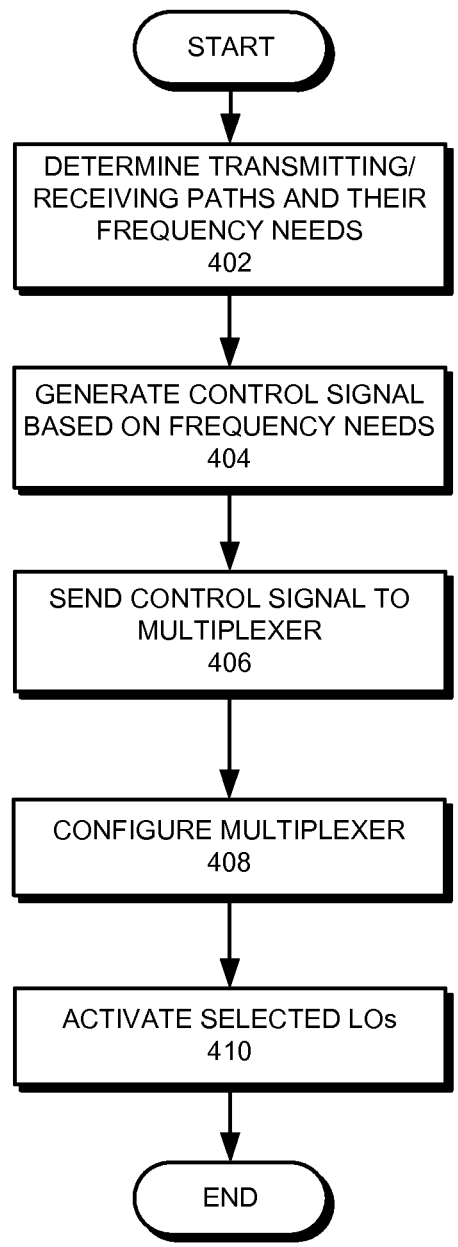
FIG. 4 presents a flowchart illustrating an exemplary process of provisioning the local oscillators (LOs), in accordance with an embodiment of the present invention.

FIG. 4 presents a flowchart illustrating an exemplary process of provisioning the local oscillators (LOs), in accordance with an embodiment of the present invention. During operation, the system determines the number of transmitting and receiving paths and their frequency needs (operation 402). Based on the frequency needs of the transmitting/receiving paths, the system generates a control signal (operation 404), and sends the control signal to the multiplexer (operation 406). Based on the control signal, the multiplexer updates its configuration to couple a number of LOs to corresponding transmitting/receiving paths (operation 408). The system then activates the selected LOs (operation 410). All other LOs remain powered off to conserve power.

In general, embodiments of the present invention provide a solution for flexible provisioning of RF resources to multiple transmitting/receiving paths. Note that the architectures shown in FIGS. 2A-3 are merely exemplary and should not limit the scope of this disclosure. For example, in FIGS. 2A-3, a bank of LOs is shared by the multiple transmitting and receiving paths. In practice, other types of RF component, such as mixers, phase shifters, amplifiers, and filters may also be shared by the multiple transmitting/receiving paths depending on the need of each transmitting/receiving path.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A wireless receiver, comprising:
 a plurality of receiving paths, wherein a particular receiving path can be configured to operate at a same or different frequency as that of a different receiving path, and wherein a particular receiving path includes at least one frequency mixer;
 a number of local oscillators; and
 a configurable multiplexer comprising a plurality of inputs and a plurality of outputs, wherein the plurality of inputs are coupled to the local oscillators, wherein the plurality of outputs are coupled to the plurality of receiving paths in a way that different outputs of the multiplexer are coupled to different receiving paths with each receiving path comprising an inphase signal path and a quadrature signal path, and wherein the multiplexer is configured in such a way as to allow a particular local oscillator to couple to frequency mixers of a subset of the plurality of receiving paths, thereby enabling flexible provisioning of the local oscillators.

2. The receiver of claim 1, further comprising a baseband controller configured to:
 determine operating frequencies of the plurality of receiving paths;
 generate a control signal based on the operating frequencies of the plurality of receiving paths; and
 send the control signal to the multiplexer in order to configure the multiplexer.

3. The receiver of claim 1, wherein the particular local oscillator is configured to couple to a subset of the plurality of receiving paths operating at a same frequency.

4. The receiver of claim 1, wherein each receiving path includes a demodulator which receives sinusoidal waves from a coupled local oscillator.

5. The receiver of claim 1, wherein the plurality of receiving paths includes one or more of:
 multiple-input and multiple-output (MIMO) paths; and
 channel aggregation paths.

6. The receiver of claim 1, wherein the one or more local oscillators coupled to the receiving paths are activated, and wherein remaining local oscillators that are not coupled to any one of the plurality of receiving paths remain inactive.

7. A wireless transmitter, comprising:
 a plurality of transmitting paths, wherein a particular transmitting path can be configured to operate at a same or different frequency as that of a different transmitting path, and wherein a particular transmitting path includes at least one frequency mixer;
 a number of local oscillators; and
 a configurable multiplexer comprising a plurality of inputs and a plurality of outputs, wherein the plurality of inputs are coupled to the local oscillators, wherein the plurality of outputs are coupled to the plurality of transmitting paths in a way that different outputs of the multiplexer are coupled to different transmitting paths with each transmitting path comprising an inphase signal path and a quadrature signal path, and wherein the multiplexer is configured in such a way as to allow a particular local oscillator to couple to frequency mixers of a subset of the plurality of transmitting paths, thereby enabling flexible provisioning of the local oscillators.

8. The transmitter of claim 7, further comprising a baseband controller configured to:
 determine operating frequencies of the plurality of transmitting paths;
 generate a control signal based on the operating frequencies of the plurality of transmitting paths; and
 send the control signal to the multiplexer in order to configure the multiplexer.

9. The transmitter of claim 7, wherein the particular local oscillator is configured to couple to a subset of the plurality of transmitting paths operating at a same frequency.

10. The transmitter of claim 7, wherein each transmitting path includes a modulator which receives sinusoidal waves from a coupled local oscillator.

11. The transmitter of claim 7, wherein the plurality of transmitting paths includes one or more of:
   multiple-input multiple-output (MIMO) paths; and
   channel aggregation paths.

12. The transmitter of claim 7, wherein the one or more local oscillators coupled to the transmitting paths are activated, and wherein remaining local oscillators that are not coupled to any one of the plurality of transmitting paths remain inactive.

13. A wireless transceiver, comprising:
   a plurality of receiving paths, wherein a particular receiving path includes at least one frequency mixer;
   a plurality of transmitting paths, wherein a particular transmitting path includes at least one frequency mixer;
   a number of local oscillators; and
   a configurable multiplexer comprising a plurality of inputs and a plurality of outputs, wherein the plurality of inputs are coupled to the local oscillators, wherein the plurality of outputs are coupled to both the plurality of receiving paths and the plurality of transmitting paths, wherein different outputs of the multiplexer are coupled to different receiving and transmitting paths with each receiving and transmitting path comprising an inphase signal path and a quadrature signal path, and wherein the multiplexer is configured in such a way as to allow a particular local oscillator to couple to frequency mixers of a subset of the receiving paths and/or a subset of the transmitting paths, thereby enabling flexible provisioning of the local oscillators.

14. The transceiver of claim 13, further comprising a baseband controller configured to:
   determine operating frequencies of the plurality of receiving paths and the plurality of transmitting paths;
   generate a control signal based on the operating frequencies of the plurality of receiving paths and the plurality of transmitting paths; and
   send the control signal to the multiplexer in order to configure the multiplexer.

15. The transceiver of claim 13, wherein the particular local oscillator is configured to couple to a subset of the plurality of receiving paths and/or a subset of the transmitting paths that are operating at a same frequency.

16. The transceiver of claim 13, wherein each receiving path includes a demodulator which receives sinusoidal waves from a coupled local oscillator, and wherein each transmitting path includes a modulator which receives sinusoidal waves from a coupled local oscillator.

17. The transceiver of claim 13, wherein the plurality of receiving paths and/or the plurality of transmitting paths includes one or more of:
   multiple-input and multiple-output (MIMO) paths; and
   channel aggregation paths.

18. The transceiver of claim 13, wherein the one or more local oscillators coupled to the receiving paths and/or transmitting paths are activated, and wherein remaining local oscillators that are not coupled to any one of the plurality of receiving paths and the plurality of transmitting paths remain inactive.

* * * * *